US009509960B2

(12) United States Patent
Mirza et al.

(10) Patent No.: US 9,509,960 B2
(45) Date of Patent: Nov. 29, 2016

(54) VEHICLE ANOMALY DETECTION AND REPORTING (71) Applicant: Verizon Patent and Licensing Inc., Arlington, VA (US)

(72) Inventors: Momin Mirza, Santa Clara, CA (US); Farooq Muzaffar, Palo Alto, CA (US); Nisheeth Gupta, Palo Alto, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 218 days.

(21) Appl. No.: 14/273,203

(22) Filed: May 8, 2014

(65) Prior Publication Data
US 2015/0321605 A1 Nov. 12, 2015

(51) Int. Cl.
*B60R 1/00* (2006.01)
*H04N 7/18* (2006.01)

(52) U.S. Cl.
CPC ............... *H04N 7/181* (2013.01); *B60R 1/00* (2013.01); *B60R 2300/105* (2013.01); *B60R 2300/804* (2013.01); *B60R 2300/8053* (2013.01)

(58) Field of Classification Search
None
See application file for complete search history.

(56) References Cited

U.S. PATENT DOCUMENTS

| 5,942,753 | A | * | 8/1999 | Dell | G01L 5/28 250/338.1 |
| 6,595,684 | B1 | * | 7/2003 | Casagrande | G01N 25/72 374/4 |
| 6,985,803 | B2 | * | 1/2006 | Abdel-Malek | G07C 5/008 246/122 R |
| 7,690,565 | B2 | * | 4/2010 | Faoro | B60R 25/04 235/382 |
| 8,230,362 | B2 | * | 7/2012 | Couch | G01M 17/00 382/190 |
| 8,982,207 | B2 | * | 3/2015 | Jang | B64F 5/0045 348/125 |
| 2005/0145794 | A1 | * | 7/2005 | Faubion | B60T 17/22 250/330 |
| 2005/0259273 | A1 | * | 11/2005 | Mian | B61K 9/08 356/601 |
| 2005/0267707 | A1 | * | 12/2005 | Mian | G06Q 10/06 702/122 |
| 2005/0270537 | A1 | * | 12/2005 | Mian | G06T 7/00 356/437 |
| 2006/0030985 | A1 | * | 2/2006 | Lawida | G06K 9/3241 701/33.4 |
| 2006/0091310 | A1 | * | 5/2006 | Furry | G01J 5/061 250/330 |
| 2006/0114531 | A1 | * | 6/2006 | Webb | G01N 21/8806 359/15 |
| 2006/0170768 | A1 | * | 8/2006 | Riley | H04N 7/181 348/143 |
| 2007/0030349 | A1 | * | 2/2007 | Riley | H04N 7/181 348/143 |
| 2007/0040911 | A1 | * | 2/2007 | Riley | H04N 7/181 348/148 |
| 2007/0064244 | A1 | * | 3/2007 | Mian | G01B 11/25 356/601 |
| 2008/0143338 | A1 | * | 6/2008 | Sekine | G01R 31/007 324/503 |
| 2009/0018721 | A1 | * | 1/2009 | Mian | G01M 17/013 701/31.4 |
| 2009/0245573 | A1 | * | 10/2009 | Saptharishi | G06K 9/00771 382/103 |
| 2009/0290757 | A1 | * | 11/2009 | Mian | G06K 9/00214 382/104 |
| 2010/0100275 | A1 | * | 4/2010 | Mian | G01M 17/013 701/31.4 |
| 2011/0052068 | A1 | * | 3/2011 | Cobb | G06K 9/00771 382/190 |
| 2014/0085477 | A1 | * | 3/2014 | Takano | B60R 25/305 348/148 |
| 2014/0310186 | A1 | * | 10/2014 | Ricci | H04W 48/04 705/302 |
| 2014/0313330 | A1 | * | 10/2014 | Carey | G06K 9/00771 348/143 |

* cited by examiner

Primary Examiner — Jonathan M Dager (57) ABSTRACT

A server device may receive images of a vehicle from one or more camera devices implemented as part of a home monitoring or home control system and identify, based on the images, an anomaly associated with the vehicle. In some implementations, conditions under which the anomaly occurred may also be determined.

20 Claims, 8 Drawing Sheets

VEHICLE ANOMALY DETECTION AND REPORTING

BACKGROUND

Vehicle damage and/or wear-and-tear may sometimes not be identified when the vehicle damage and/or wear-and-tear is not readily apparent (e.g., if the damage and/or wear-and-tear is out of sight, such as on an underside of the vehicle, and/or if damage occurs during night time hours). Driving a vehicle having damage or worn out critical components may be hazardous to a driver of the vehicle and surrounding motorists.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may identify an anomaly relating to a vehicle (e.g., damage, maintenance wear-and-tear items, etc.), based on image analysis techniques. The systems and/or methods may determine the conditions under which the anomaly occurred, and may output an alert regarding the anomaly. The systems and/or methods may alert an owner of the vehicle with regards to the anomaly even when the anomaly is not readily apparent (e.g., if the anomaly occurs at night time, or is on an underside of the vehicle). As a result, safety may be improved by alerting the user with regards to an anomaly, such as vehicle damage, when the anomaly is not readily apparent. In some implementations, the systems and/or methods may also determine that a particular road may be hazardous based on identifying common anomalies from multiple different vehicles that frequently drive on the particular road.

Figure 1:
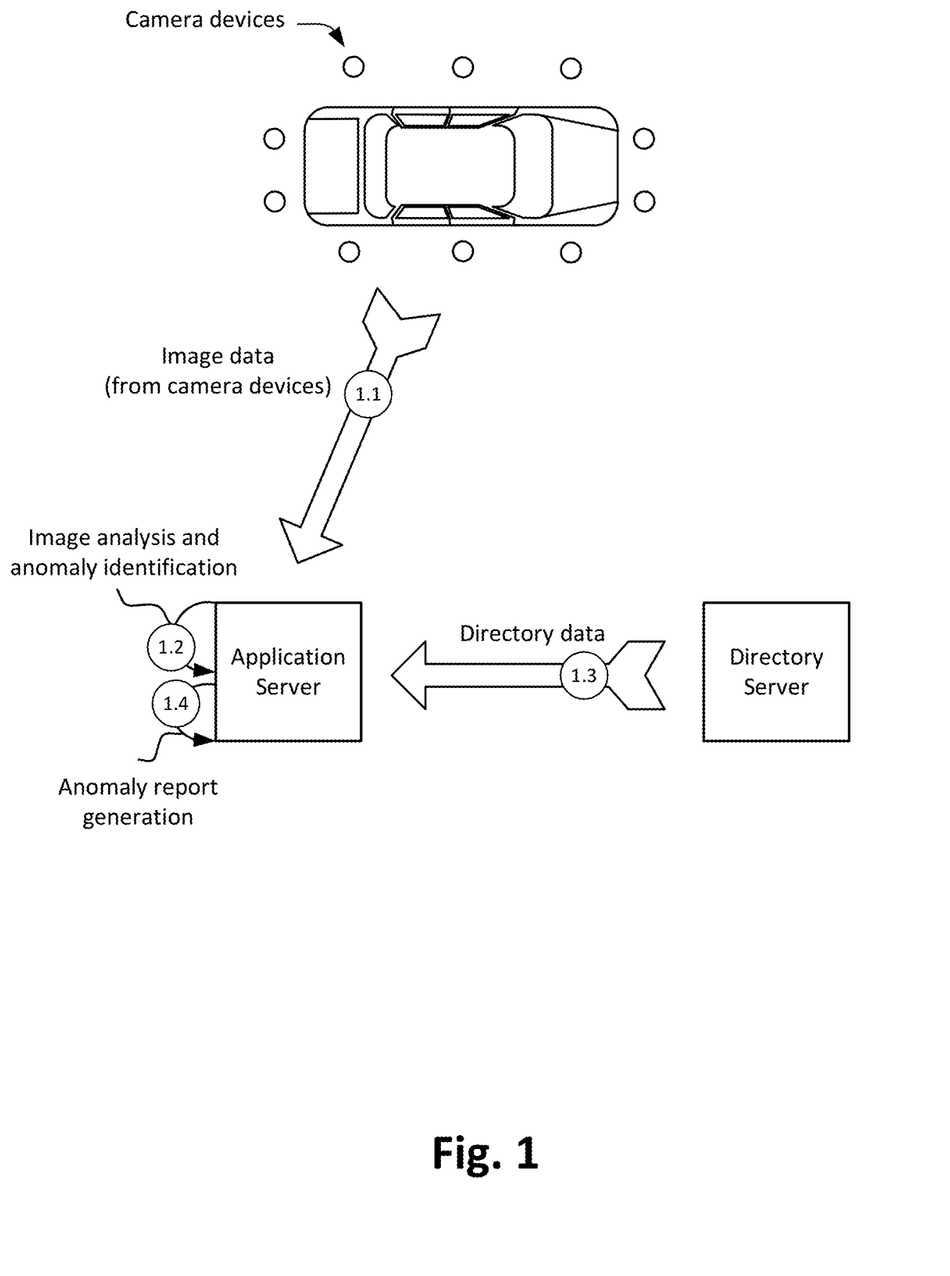
FIG. 1 illustrates an example overview of an implementation described herein.

FIG. 1 illustrates an example overview of an implementation described herein. As shown in FIG. 1, one or more camera devices may capture images of a vehicle (e.g., when the vehicle is parked in a garage or parking space in which the camera devices are implemented). For example, the one or more camera devices may be implemented as part of a home monitoring or home control system (e.g., a system that may automate home device operations, provide status reports regarding the status of a home and/or devices associated with the home, etc.). The camera devices may output image data to an application server (arrow 1.1). The application server may analyze the image data, and may identify an anomaly based on the image data (arrow 1.2). For example, the application server may identify an anomaly, such as visual damage (e.g., scratches, dents, foreign objects, etc.), visual wear-and-tear on the vehicle (e.g., low tire pressures, tire tread wear, paint wear, damaged or worn suspension components, etc.), and/or some other type of anomaly. The anomaly detection may be generally based on a comparison of current images of the vehicle with previous images of the vehicle.

As further shown in FIG. 1, the application server may receive, from a directory server (1.3), directory data, such as data relating to weather information, traffic information, and/or some other information that the application server may use to determine the conditions under which the anomaly occurred. In some implementations, the application server may further determine the conditions under which the anomaly occurred based on route data (e.g., data identifying where the vehicle had been driven), vehicle activity data (e.g., information from an on-board diagnostics system of the vehicle), vehicle accelerometer data, and/or some other information.

Based on determining the conditions under which the anomaly occurred, the application server may generate a report that identifies the anomaly and the conditions under which the anomaly occurred (arrow 1.4). The application may store the report and/or output the report to a user device associated with an owner of the vehicle. In some implementations, the report may be output as an alert to the owner of the vehicle. As an example, the application server may identify an anomaly, such as a scratch on the vehicle based on comparing image data, received from the camera devices after a vehicle returned from the trip, with image data received from the camera devices before the vehicle embarked on the trip. The application server may provide an alert regarding the anomaly to the vehicle owner.

As another example, the application server may identify an anomaly corresponding to gradual wear on the vehicle (e.g., paint wear, tire wear, break wear, and/or some other type of visual wear), and determine the conditions causing the gradual wear (e.g., weather, driving routes, traffic conditions under which the vehicle is driven, etc.). The application server may output a report identifying the gradual wear, the conditions under which the gradual wear occurred, and possible suggestions of how to reduce the gradual wear (e.g., changing driving routes when a particular driving route may be correlated to the cause of the gradual wear).

While systems and/or methods are described in terms of identifying anomalies in a vehicle, the systems and/or methods are not so limited. For example, anomalies in other objects may be identified based on comparing images of the object with non-anomalous images of the object.

Figure 2:
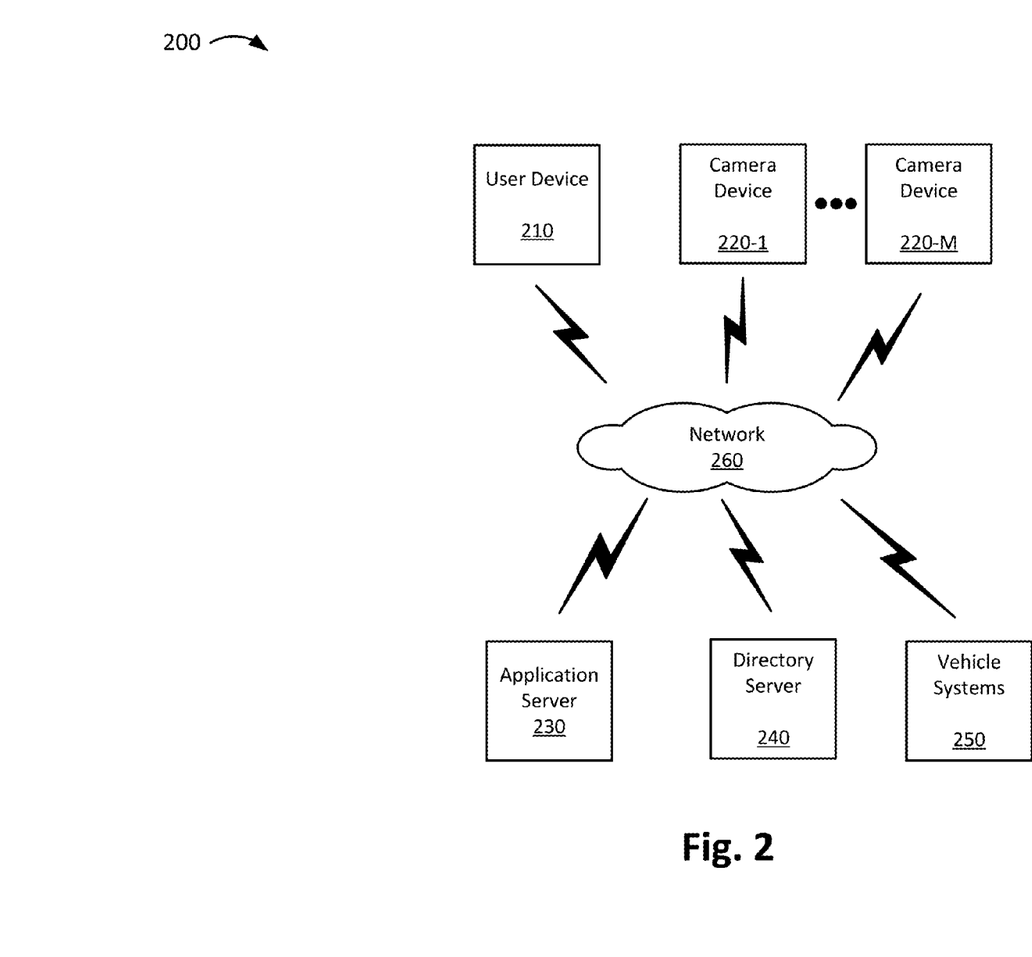
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210, camera devices 220-1 through 220-M (where M is an integer greater than or equal to 1), application server 230, directory server 240, and network 260.

User device 210 may include a device capable of communicating via a network, such as network 260. For example, user device 210 may correspond to a mobile communication device (e.g., a smart phone or a personal digital assistant (PDA)), a portable computer device (e.g., a laptop or a tablet computer), a desktop computer device, a gaming device, a set-top box, or another type of device. User device 210 may receive anomaly reports and/or anomaly alerts from application server 230.

In some implementations, user device 210 may provide information regarding user activity patterns and/or user habits to application server 230. For example, user device 210 may provide activity information, such as web browsing activity, television viewing activity, network activity, and/or some other activity associated with user device 210. Based on this information, application server 230 may determine the user's activity patterns and/or habits to identify hours in which the vehicle is unlikely to be in use and when camera devices 220 may capture image data of the vehicle. In some implementations, user device 210 may output, to application server 230, vehicle analytics information, such as accelerometer data, route data, and/or some other information that application server 230 may use to identify conditions under which an anomaly occurred.

Camera device 220 may capture images of a vehicle, and provide image data to application server 230. For example, multiple camera devices 220 may capture images of a vehicle at multiple angles, including underneath the vehicle. In some implementations, camera device 220 may capture some other data, such as heat data which application server 230 may use to identify vehicle anomalies. Camera device 220 may capture image data using different techniques. For example, camera device 220 may capture image data using an "intense imaging" technique in which images are captured from multiple angles and at different zooming levels. Additionally, or alternatively, camera device 220 may capture image data using a "quick imaging" technique in which images are captured using simpler and less complex algorithms than those used in the intense imaging technique. Camera device 220 may use one technique versus another technique based on user activity patterns. For example, application server 230 may instruct camera device 220 to use an intense imaging technique at hours in which the vehicle is unlikely to be driven for an extended period of time.

Multiple camera devices 220 may be implemented in a garage or parking space associated with a particular vehicle. Camera devices 220 may be implemented on or in walls, ceilings, floors, posts, and/or in some other location. Additionally, or alternatively, camera devices 220 may be implemented within a vehicle. In some implementations, camera devices 220 may include lasers and/or some other type of parking aid to aid in the alignment of the vehicle with camera devices 220 when the vehicle is parked (e.g., so that the vehicle is in the same position each time the vehicle is parked and images are captured by camera devices 220). Camera devices 220 may also include lighting devices and/or light controllers to adjust the lighting conditions under which images are captured. Camera devices 220 may detect vehicle presence (e.g., using object detection sensors, heat sensors, etc.), and may capture vehicle images based on detecting the vehicle presence. Camera devices 220 may be implemented as part of a home control and monitoring system (e.g., a system that may automate home device operations, provide status reports regarding the status of a home and/or devices associated with the home, etc.).

Application server 230 may include one or more computing devices, such as a server device or a collection of server devices. In some implementations, application server 230 may receive imaging data from camera device 220, and determine an anomaly based on the imaging data. In some implementations, application server 230 may identify a "single trip anomaly" after the vehicle returned from a trip. Additionally, or alternatively, application server 230 may identify a "gradual anomaly" corresponding to a gradual change in vehicle appearance over a period of time and over multiple trips (e.g., a gradual degradation of vehicle paint color, tire pressure, etc.). Application server 230 may identify the conditions under which anomalies occurred based on information received from user device 210, vehicle systems 250, and/or directory server 240.

Application server 230 may receive information from user devices 210 regarding user activity patterns and/or user habits. Application server 230 may determine hours in which camera devices 220 should capture image data based on the user's activity patterns. Application server 230 may output instructions to camera devices 220 to capture images at particular times using particular techniques based on the user's activity patterns.

Directory server 240 may include one or more computing devices, such as a server device or a collection of server devices. In some implementations, directory server 240 may store and output weather information, traffic information (e.g., traffic density information, traffic accident reports, etc.), crime reports (e.g., relating to vehicle vandalism), road hazard reports (e.g., relating to road hazards such as debris, potholes, etc.), and/or some other information that may be used to identify conditions under which vehicle anomalies occurred.

Vehicle systems 250 may include one or more devices that store and/or output vehicle analytics information, such as vehicle acceleration data, diagnostics data, and/or some other type of vehicle analytics information. In some implementations, vehicle systems 250 may include a GPS device that stores and/or outputs vehicle route history. Vehicle systems 250 may output information to application server 230.

Network 260 may include one or more wired and/or wireless networks. For example, network 260 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 260 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
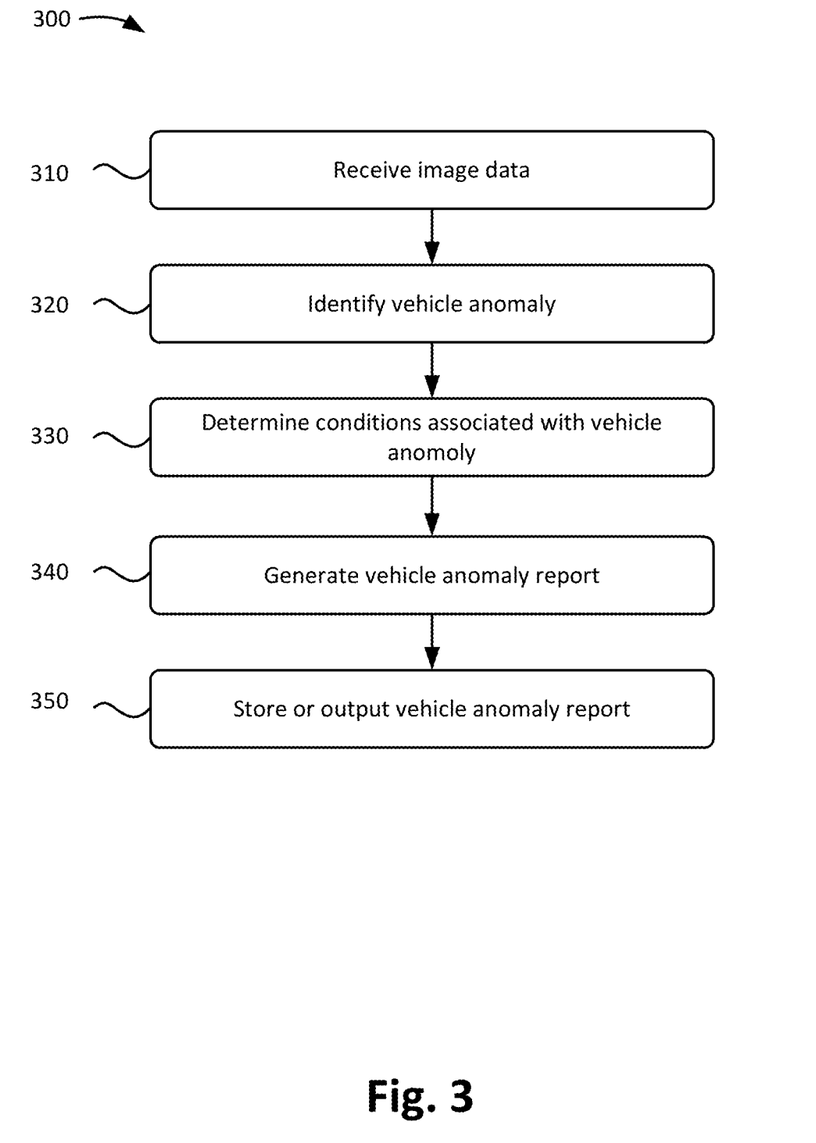
FIG. 3 illustrates a flowchart of an example process for generating a vehicle anomaly report.

FIG. 3 illustrates a flowchart of an example process 300 for generating a vehicle anomaly report. In some implementations, process 300 may be performed by application server 230. In some implementations, some or all of blocks of process 300 may be performed by one or more other devices.

As shown in FIG. 3, process 300 may include receiving image data (block 310). For example, application server 230 may receive image data from one or more camera devices 220. In some implementations, camera devices 220 may provide image data based on user activity information. Additionally, or alternatively, camera devices 220 may automatically capture images of a vehicle when detecting vehicle presence, and provide image data to application server 230 without receiving an instruction to provide the image data. For example, camera devices 220 may be implemented as part of a home monitoring and control system (e.g., a system that may automate home device operations, provide status reports regarding the status of a home and/or devices associated with the home, etc.). Camera devices 220 may automatically capture images of the vehicle when the vehicle returns to a home location in which camera devices 220 are implemented.

Process 300 may also include identifying a vehicle anomaly (block 320). For example, application server 230 may identify a vehicle anomaly based on the received image data. In some implementations, application server 230 may identify the anomaly by comparing the received image data with previously stored image data (e.g., images of the vehicle in "normal" or non-anomalous conditions). For example, application server 230 may perform a pixel-based comparison by comparing pixels of the previously stored image data with pixels of the received image data. Additionally, or alternatively, application server 230 may perform a comparison of heat images between the received image data and the previously stored image data. In some implementations, application server 230 may analyze images from multiple angles in order to identify the vehicle anomaly.

As described above, application server 230 may identify a "single trip" or "short-term" anomaly after the vehicle has returned from a particular trip (e.g., by comparing image data of the vehicle before leaving for the trip with image data after returning from the trip). Additionally, or alternatively application server 230 may identify a "gradual wear" anomaly corresponding to a gradual change in vehicle appearance over a period of time and over multiple trips (e.g., a gradual degradation of vehicle paint color, tire pressure, etc.). For example, application server 230 identify a gradual anomaly by comparing image data over a span of time to detect paint wear, tire wear, break wear, and/or some other type of visual wear on the vehicle.

Application server 230 may identify anomalies, such as vehicle damage (e.g., collision damage, paint damage, vandalism, etc.), vehicle wear (tire wear, brake wear, low tire pressures, etc.), and/or some other type of anomaly. As an example, application server 230 may identify a "single trip" anomaly, such as a scratch on the vehicle (e.g., based on a pixel-based analysis of the data). As another example, application server 230 may identify a "gradual wear" anomaly, such as paint wear when the condition of the vehicle's paint deteriorates over time (e.g. when the vehicle's paint color gradually fades over time, and/or when blemishes, such as marks, scratches, cracks, dents, etc., appear on the paint over a period of time). In some implementations, application server 230 may identify that the gradual wear is considered excessive wear. For example, application server 230 may identify excesses paint deterioration if the vehicle's paint color fades greater than a threshold percentage over a particular period of time. Similarly, application server 230 may identify excessive paint deterioration if the severity or quantity of blemishes exceeds a particular threshold over a particular amount of time. In some implementations, application server 230 may identify a severity of the vehicle anomaly based on the location of the anomaly, the size of the anomaly, and/or some other attribute of the anomaly.

Process 300 may further include determining conditions associated with the vehicle anomaly (block 330). In some implementations, application server 230 may determine the conditions under which the anomaly occurred by correlating analytics information with the vehicle anomaly. For example, application server 230 may correlate analytics information, such as directory information received from directory server 240, vehicle route information received from user device 210 and/or a GPS device of the vehicle, vehicle analytics information from user device 210 and/or an on-board diagnostics system of the vehicle, and/or some other information that may be used to determine the conditions under which the anomaly occurred.

As an example, assume that application server 230 identifies a "single trip" anomaly, such as a dent on the vehicle. Further, assume that application server 230 receives vehicle analytics and vehicle route information that identifies that the vehicle experienced a sudden lateral acceleration at a particular location along the vehicles route. Given these assumptions, application server 230 may identify the anomaly, and where, along the vehicle's route, the anomaly occurred.

As another example, assume that over a period of time, application server 230 identifies excessive paint deterioration on a particular vehicle associated with the image data (e.g., when the color of the paint fades greater than a threshold percentage over a particular period of time and/or when the severity or quantity of blemishes exceeds a particular threshold over a particular amount of time). Further, assume that application server 230 identifies similar levels of excessive paint deterioration on other vehicles (e.g., based on image data of other vehicles), and that the paint deterioration on the other vehicles is in a similar location and/or of a similar pattern as the paint deterioration on the particular vehicle. Further, assume that application server 230 identifies that the route take by the other vehicles is similar to the route taken by the particular vehicle. Given these assumptions, application server 230 may determine that the paint deterioration is associated with the route taken by the particular vehicle (e.g., a route associated with the vehicle owner's commute). In some implementations, application server 230 may identify a particular street that may be correlated with excessive paint deterioration, and may suggest, to the vehicle owner, an alternate street to take along a particular route.

As another example, assume that application server 230 identifies excessive paint deterioration on the particular vehicle, such as blemishes, cracks, or ruptures on the surface of the vehicle (e.g., when the deterioration occurs within a threshold period of time). Further, assume that application server 230 receives directory information received from directory server 240 that a hail storm had passed through an area where the vehicle was located. Given these assumptions, application server 230 may identify that the excessive paint deterioration was due to the hail storm. As a similar example, application server 230 may identify paint discoloration and spotting, and correlate the discoloration and spotting with information received from directory server 240 identifying acid rain in the area of the vehicle.

In some implementations, application server 230 may determine the conditions associated with the anomaly based on pixel-based analysis. For example, application server 230 may identify an anomaly, such as a foreign object on the vehicle's paint when the foreign object is identified on the image of the vehicle using pixel-based analysis. As another example, application server 230 may identify an anomaly, such as a cracked windshield or window. Application server 230 may identify the anomaly when the anomaly is not readily apparent (e.g., at night hours), and, as described in greater detail below, may alert an owner of the vehicle with regards to the anomaly so that the anomaly can be repaired.

Process 300 may also include generating a vehicle anomaly report (block 340). For example, application server 230 may generate a vehicle anomaly report that identifies a vehicle anomaly and the conditions under which the anomaly occurred. The report may also identify the type of anomaly (e.g., excessive wear, damage, etc.), and a location on the vehicle where the anomaly exists. The report may include images of the anomaly, and may include suggestions on how to correct or avoid future anomalies (e.g., by avoiding a street that may be responsible for excessive paint deterioration or damage).

Process 300 may further include storing or outputting the vehicle anomaly report (block 350). For example, application server 230 may store the vehicle anomaly report. Additionally, or alternatively, application server 230 may output the vehicle anomaly report based on receiving a request from an owner of the vehicle (e.g., via user device 210). In some implementations, application server 230 may output the vehicle anomaly report without receiving a request. For example, application server 230 may output the vehicle anomaly report in the form an alert to notify the user with regards to an anomaly that the user may not have noticed, but should quickly rectify (e.g., a cracked windshield, a foreign object that may be stuck on the surface of the vehicle, etc.).

Figure 4:
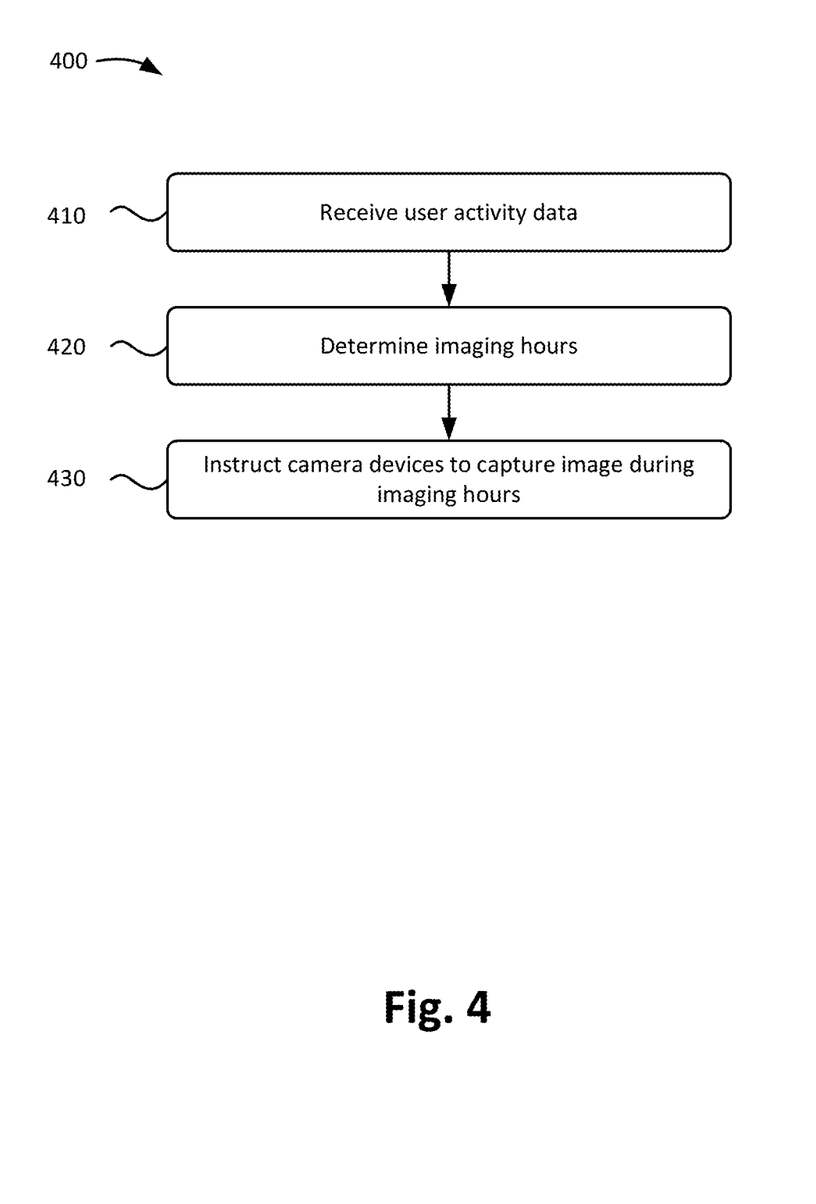
FIG. 4 illustrates a flowchart of an example process for determining hours in which a vehicle is expected to be available for imaging.

FIG. 4 illustrates a flowchart of an example process 400 for determining hours in which a vehicle is expected to be available for imaging. In some implementations, process 400 may be performed by application server 230. In some implementations, some or all of blocks of process 400 may be performed by one or more other devices.

As shown in FIG. 4, process 400 may include receiving user activity data (block 410). For example, application server 230 may receive the user activity data, which may be used to determine habits and/or patterns of a user (e.g., an owner of a vehicle). In some implementations, application server 230 may receive (e.g., from user devices 210 associated with the user), network usage information, television or content viewing activity information, and/or some other information that application server 230 may use to determine user patterns or user habits. The user activity data may be used to determine imaging hours in which the vehicle is expected to remain stationary for an extended period of time and available for imaging.

Process 400 may also include determining imaging hours (block 420). For example, application server 230 may determine the imaging hours based on the user activity data. As an example, application server 230 may determine (e.g., from the user device activity data) that the user routinely accesses content (e.g., via user device 210, such as a set-top box), at particular hours (e.g., the hours of 8 PM-10 PM). Accordingly, application server 230 may determine imaging hours of 8 PM-10 PM since the vehicle is expected to remain stationary during this period of time. As another example, application server 230 may determine that the user's network usage from the user's home (e.g., via user device 210) between the hours of 7 PM-10 PM routinely exceeds a particular threshold. Accordingly, application server 230 may determine imaging hours of 7 PM-10 PM (e.g., since the network usage indicates that the user is actively using user device 210 instead of driving the vehicle).

Process 400 may further include instructing camera devices to capture images during the imaging hours (block 430). For example, application server 230 may instruct camera devices 220 to capture images during the determined imaging hours. In some implementations, application server 230 may instruct camera devices 220 to capture images using a particular technique based on the amount of time that the vehicle is expected to remain stationary. For example, the longer the amount of time that the vehicle is expected to remain stationary, the more intensely camera devices 220 may image the vehicle. Based on receiving the instruction to capture vehicle images, camera devices 220 may capture the vehicle images, and output image data to application server 230.

Figure 5:
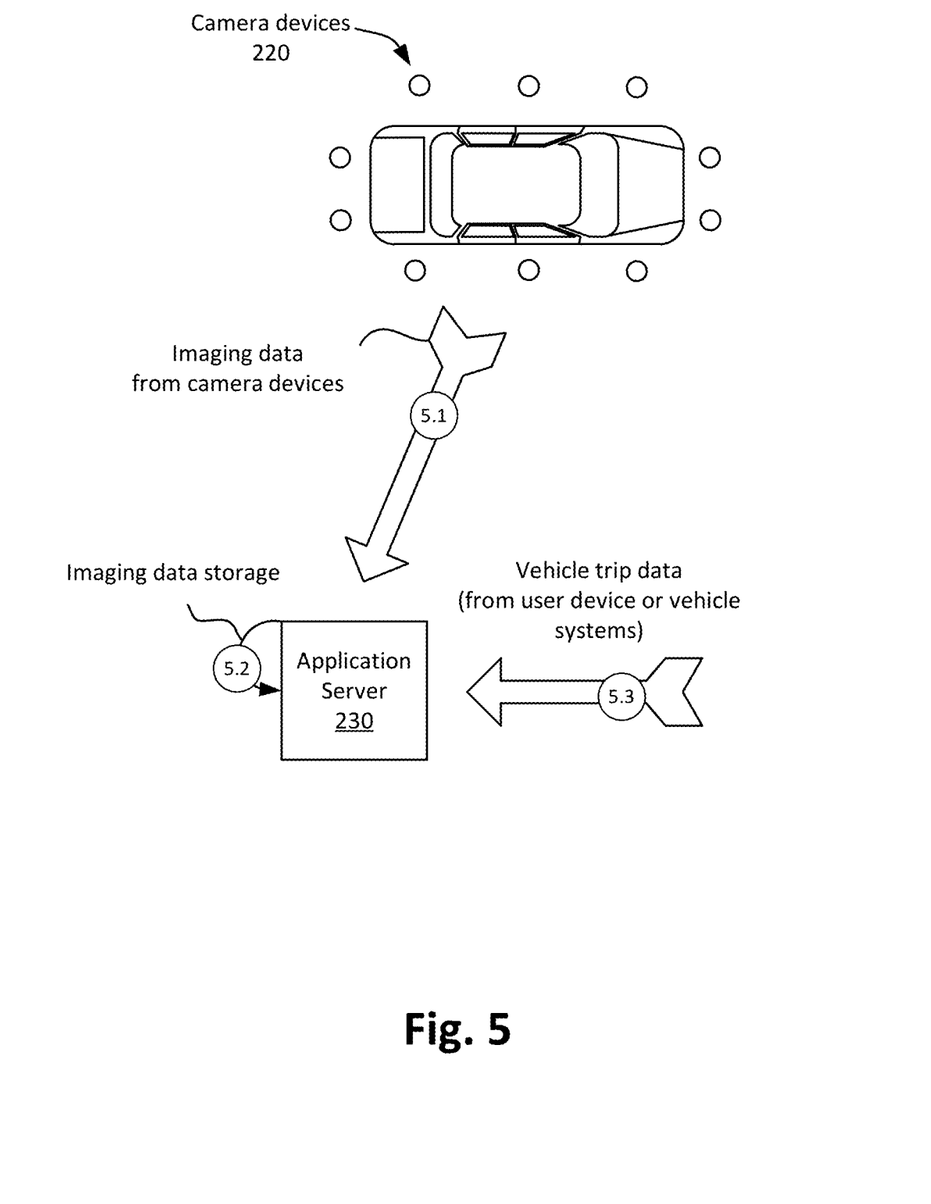
FIGS. 5-7 illustrate an example implementation for identifying a vehicle anomaly and outputting an alert to an owner regarding the vehicle anomaly.
Figure 6:
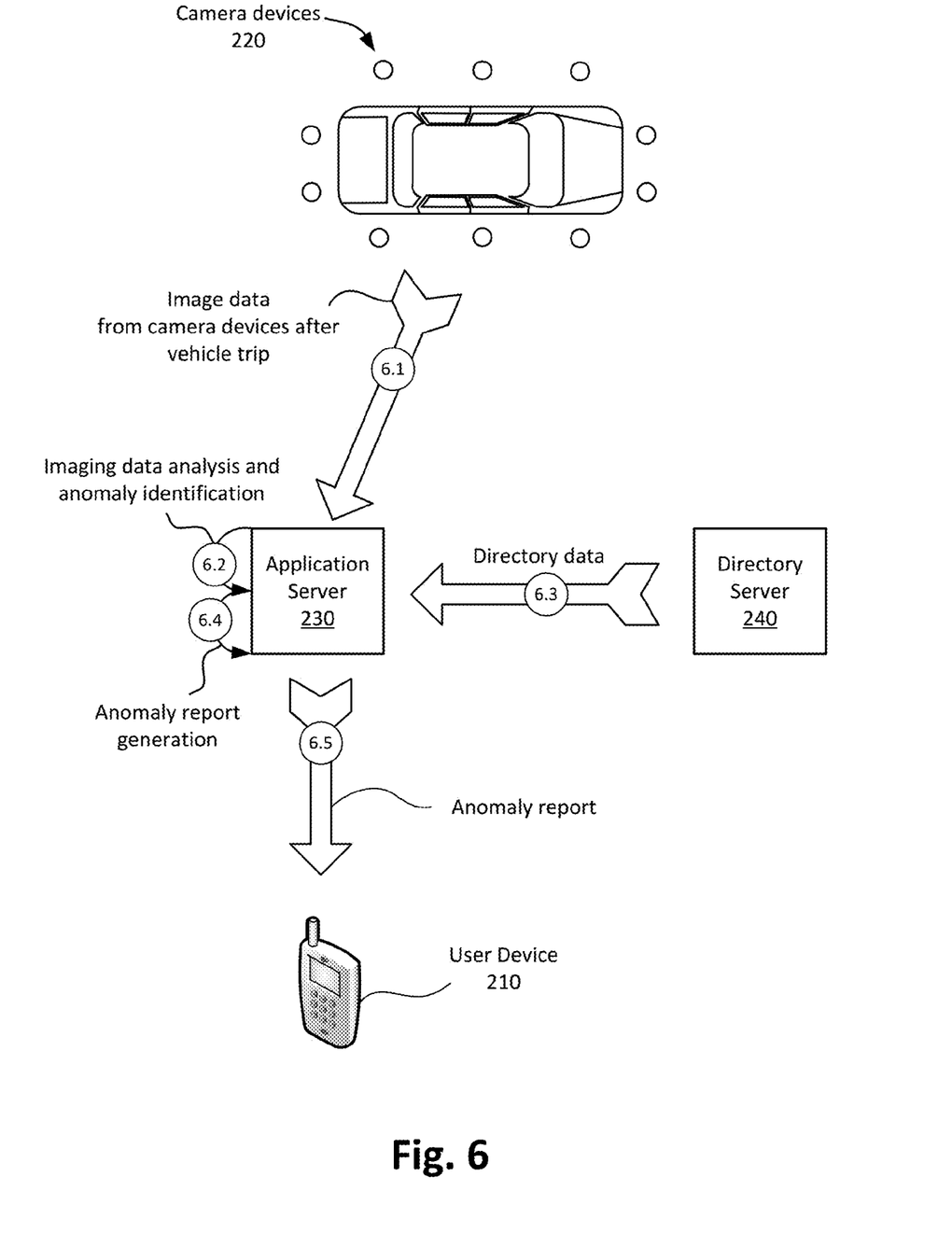
Figure 7:
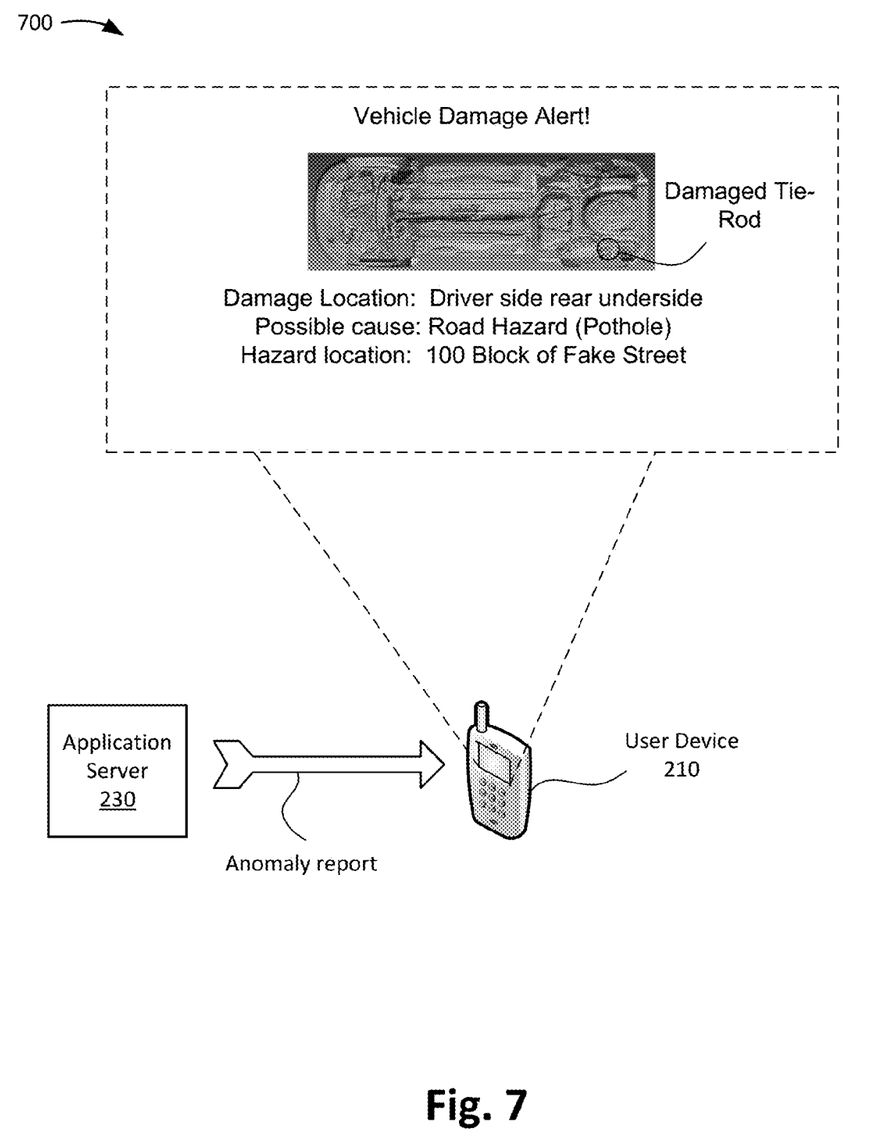

FIGS. 5-7 illustrate an example implementation for identifying a vehicle anomaly and outputting an alert to an owner regarding the vehicle anomaly. As shown in FIG. 5, camera devices 220 may capture images of a vehicle and provide imaging data to application server 230 (arrow 5.1). For example, camera devices 220 may capture the images when the vehicle is parked in a garage or parking space during imaging hours. Application server 230 may store the image data (arrow 5.2). Assume that, at a later time after application server 230 receives and stores the imaging data, the vehicle is driven by an owner of the vehicle. Application server 230 may receive vehicle trip data identifying that the vehicle has been driven and identifying where the vehicle has been driven. For example, application server 230 may receive vehicle trip data from a GPS associated with the vehicle and/or from user device 210 associated with a driver of the vehicle.

Referring to FIG. 6, camera devices 220 may capture images of the vehicle after the vehicle returns from the trip (e.g., captured images after the vehicle has returned from the trip or when camera devices 220 detect the presence of the vehicle after returning from the trip). Application server 230 may receive imaging data from camera devices 220 (arrow 6.1), analyze the imaging data, and identify a vehicle anomaly (arrow 6.2). For example, application server 230 may compare images of the vehicle before the trip with images of the vehicle after returning from the trip to identify that the anomaly (e.g., conditions of the vehicle have changed). Additionally, or alternatively, application server 230 may compare images of the vehicle after returning from the trip with non-anomalous images of the vehicle (e.g., images of the vehicle when the vehicle does not have anomalies). As an example, application server 230 may determine an anomaly, such as a damaged underside of the vehicle.

Application server 230 may receive directory data from directory server 240 (arrow 6.3) to aid application server 230 in determining the conditions associated with the anomaly. For example, application server 230 may determine that the anomaly may be related to weather conditions (e.g., based on weather reports), traffic conditions (e.g., based on traffic reports), road accidents (e.g., based on accident reports), road hazards (e.g., potholes, etc., based on road hazard reports), vandalism (e.g., based on police reports of vandalism), etc.

Application server 230 may generate an anomaly report (arrow 6.4) identifying the anomaly, the type of anomaly, the severity of the anomaly, and/or conditions under which the anomaly occurred. As an example, application server 230 may generate an anomaly report that identifies that the underside of the vehicle was damaged, and may determine, based on road hazard information, that the vehicle may have been damaged as a result of a pothole that was present along the vehicle's route.

Application server 230 may provide the anomaly report to user device 210 (arrow 6.5). In some implementations, the anomaly report may be in the form of an alert to notify the user of the anomaly. The alert may aid the user in identifying the anomaly if the anomaly is not readily apparent (e.g., if the anomaly occurred during the night hours, is present on an underside of the vehicle, etc.).

Referring to FIG. 7, user device 210 may receive the anomaly report, and display the anomaly report as an alert. As shown in interface 700, the anomaly report may identify the type of anomaly (e.g., damaged tie-rod) location of the anomaly on the vehicle (e.g., the rear driver side of the vehicle underside), an image of the anomaly, a possible cause of the anomaly (e.g., a pothole), and/or some other information relating to the anomaly. Based on the anomaly report, the owner of the vehicle may be made aware of the anomaly even when the anomaly is not readily apparent (e.g., since the anomaly is of vehicle damage on the underside of the vehicle). As a result, safety may be improved by alerting the vehicle's owner with regard to vehicle damage when the vehicle damage is not readily apparent.

While a particular example is shown in FIGS. 5-7, the above description is merely an example implementation. In practice, other examples are possible from what is described above in FIGS. 5-7. For example, the anomaly report may identify another type of anomaly than what is described above, and may also identify a hazardous route by correlating anomaly information from multiple different vehicles with a particular route (e.g., the hazardous route). The anomaly report may suggest an alternate route in order to avoid future damage based on identifying the hazardous route. Also, while a particular format of interface 700 is shown, in practice, interface 700 may have a different format and appearance than what is shown in FIG. 7.

Figure 8:
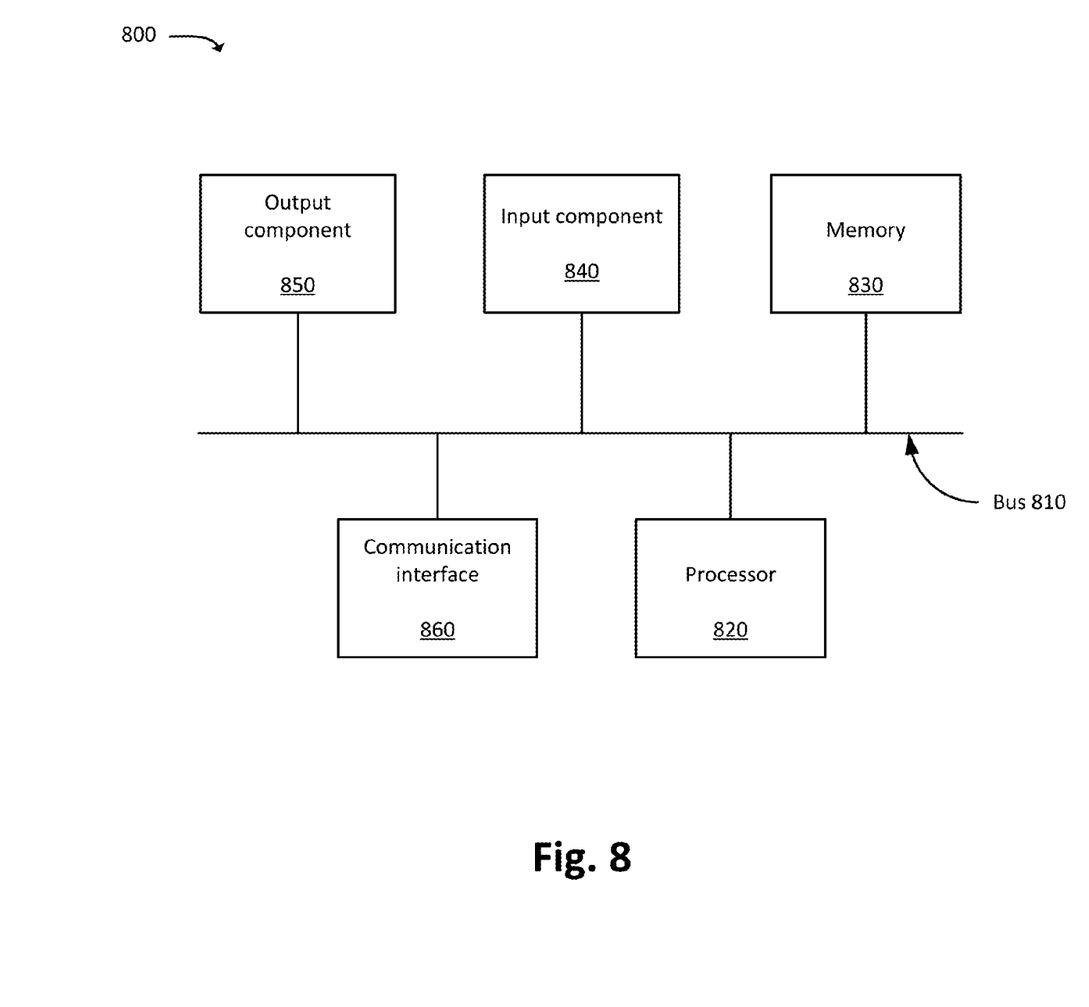
FIG. 8 illustrates example components of one or more devices, according to one or more implementations described herein.

FIG. 8 is a diagram of example components of device 800. One or more of the devices described above (e.g., with respect to FIGS. 1, 2, and 5-7) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 3 and 4, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 1, 2, and 5-7), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving, by a server device, a plurality of images of a vehicle from a plurality of camera devices positioned in a vicinity of a parking space of the vehicle;
   identifying, by the server device, an anomaly associated with the vehicle, the identifying including:
      analyzing the plurality of images relative to a previous plurality of images that were taken of the vehicle by the plurality of camera devices; and
   outputting, by the server device, an alert for a user of the vehicle, the alert identifying the anomaly.

2. The method of claim 1, further comprising determining conditions associated with the anomaly, wherein determining the conditions associated with the anomaly includes:
   receiving directory information as information relating to at least one of:
      weather information,
      traffic information,
      road hazard reports, or
      crime reports; and
   correlating the directory information with the anomaly.

3. The method of claim 1, further comprising determining conditions associated with the anomaly, wherein determining the conditions associated with the anomaly includes at least one of:
   determining a type of the anomaly,
   determining a location on the vehicle associated with the anomaly, or
   determining a route associated with the anomaly.

4. The method of claim 1, further comprising:
   determining a hazardous route based on identifying that a plurality of anomalies of a plurality of vehicles are associated with the hazardous route; and
   storing or outputting information regarding the hazardous route.

5. The method of claim 1, wherein identifying the anomaly includes:
   identifying the anomaly based on pixel-based comparison techniques between the plurality of images and the previous plurality of images.

6. The method of claim 1, wherein receiving the images from the plurality of camera devices is based on instructing the plurality of camera devices to output the images to the server device when the plurality of camera devices detect a presence of the vehicle.

7. A system comprising:
   a server device, comprising:
      a non-transitory memory device storing:
         a plurality of processor-executable instructions; and
      a processor configured to execute the processor-executable instructions, wherein executing the processor-executable instructions causes the processor to:
         receive a plurality of images of a vehicle from a plurality of camera devices positioned in a vicinity of a parking space of the vehicle;
         identify an anomaly associated with the vehicle, the identifying including:
            analyzing the plurality of images relative to a previous plurality of images that were taken of the vehicle by the plurality of camera devices; and
         output an alert for a user of the vehicle, the alert identifying the anomaly.

8. The system of claim 7, wherein executing the processor-executable instructions causes the processor to:
   determine conditions associated with the anomaly, wherein determining the conditions includes
      receiving directory information as information relating to at least one of:
         weather information,
         traffic information,
         road hazard reports, or
         crime reports; and
   correlate the directory information with the anomaly.

9. The system of claim 7, wherein executing the processor-executable instructions causes the processor to:
   determine conditions associated with the anomaly, wherein determining the conditions associated with the anomaly includes at least one of:
      a type of the anomaly,
      a location on the vehicle associated with the anomaly, or
      a route associated with the anomaly.

10. The system of claim 7, wherein executing the processor-executable instructions further causes the processor to:
    determine a hazardous route based on identifying that a plurality of anomalies of a plurality of vehicles are associated with the hazardous route; and
    store or output information regarding the hazardous route.

11. The system of claim 7, wherein executing the processor-executable instructions, to determine the conditions associated with the anomaly, causes the processor to identify the anomaly based on pixel-based comparison techniques between the plurality of images relative to a previous plurality of images.

12. The system of claim 7, wherein executing the processor-executable instructions, to receive the images from the plurality of camera devices, causes the processor to receive the images from the plurality of camera devices based on instructing the plurality of camera devices to output the plurality of images to the server device when the plurality of camera devices detect a presence of the vehicle.

13. A method comprising:
- receiving, by a server device, activity information relating to habits of an owner of a vehicle;
- determining, by the server device, a time period in which the vehicle is expected to be stationary based on the activity information;
- outputting, by the server device, an instruction to one or more camera devices to capture images of the vehicle during the time period;
- receiving, by the server device and from one or more camera devices implemented as part of a home monitoring or home control system, the images of the vehicle during the time period;
- analyzing, by the server device, the images with respect to previous images of the vehicle to detect anomalies associated with the vehicle; and
- outputting, by the server device, an indication of the detected anomalies.

14. The method of claim 13, wherein the activity information includes at least one of:
- network usage information of the owner, or
- content viewing activity information of the owner.

15. The method of claim 13, further comprising:
- determining conditions associated with the anomalies; and
- storing or outputting information identifying the anomalies.

16. The method of claim 13, further comprising:
- determining a hazardous route based on identifying that a plurality of anomalies of a plurality of vehicles are associated with the hazardous route; and
- storing or outputting information regarding the hazardous route.

17. The method of claim 1, wherein images received, from at least one of the cameras of the plurality of cameras, are of an underside of the vehicle.

18. The method of claim 1, wherein the alert, identifying the anomaly, includes an image of the anomaly.

19. The system of claim 7, wherein images received, from at least one of the cameras of the plurality of cameras, are of an underside of the vehicle.

20. The system of claim 7, wherein the alert, identifying the anomaly, includes an image of the anomaly.

* * * * *